United States Patent [19]

Ruehr et al.

[11] 4,220,171
[45] Sep. 2, 1980

[54] CURVED CENTERLINE AIR INTAKE FOR A GAS TURBINE ENGINE

[75] Inventors: William C. Ruehr; James L. Younghans, both of Cincinnati; Edwin B. Smith, Mason, all of Ohio

[73] Assignee: The United States of America as represented by the Administrator of the National Aeronautics and Space Administration, Washington, D.C.

[21] Appl. No.: 38,980

[22] Filed: May 14, 1979

[51] Int. Cl.³ .............................................. B64D 33/02
[52] U.S. Cl. ..................................... 137/15.1; 181/214
[58] Field of Search .......................... 137/1, 15.1, 15.2; 181/214

[56] References Cited

U.S. PATENT DOCUMENTS

| | | |
|---|---|---|
| 3,011,307 | 12/1961 | Edelfelt . |
| 3,194,487 | 7/1965 | Tyler et al. |
| 3,765,623 | 10/1973 | Donelson . |
| 4,075,833 | 2/1978 | Sargisson . |

Primary Examiner—Alan Cohan
Attorney, Agent, or Firm—Donald W. Walk; Derek P. Lawrence; Norman T. Musial

[57] ABSTRACT

An inlet for a gas turbine engine is disposed about a curved centerline for the purpose of accepting intake air that is flowing at an angle to engine centerline and progressively turning that intake airflow along a curved path into alignment with the engine. This curved inlet is intended for use in under-the-wing locations and similar regions where airflow direction is altered by aerodynamic characteristics of the airplane. By curving the inlet, aerodynamic loss and acoustic generation and emission are decreased.

7 Claims, 4 Drawing Figures

CURVED CENTERLINE AIR INTAKE FOR A GAS TURBINE ENGINE

The invention herein described was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

This invention relates to inlets for gas turbine aircraft engines.

2. Summary of the Prior Art

Most current generation air intakes on subsonic commercial aircraft engines are drooped or angled to align the inlet at the nacelle forward face with surrounding freestream airflow, the direction of which has been altered by aerodynamic characteristics of the airplane. This is particularly true of under-the-wing mounting locations where the airplane wing and engine pylon substantially alter the direction of airflow to follow wing contour. Typically, the inlet is angled or canted 3-5 degrees to match the airflow incidence angle under the wing at cruise conditions. This droop or angle has been achieved by orienting internal contours of the inlet symmetrically about a straight centerline, inclined to the engine centerline.

Testing and theoretical analysis has indicated that orienting the inlet about a straight canted centerline, in the manner described above, causes problems where the engine inlet interfaces with an engine fan. In the region of this interface, the inner contours of the canted inlet must be faired into internal contours of the engine. A fairing at this interface abruptly turns incoming airflow from the direction of the inlet centerline to the direction of the engine centerline. Tests have shown that this fairing introduces a circumferential static pressure gradient at the interface region which increases the generation of fan tone noise.

Another feature of inlet drooping is that it affects external cowl shape and therefore nacelle drag characteristics. In general, the inlet external cowl shape (i.e. projected area and length) is selected to be thin enough for low wetted area and friction drag but thick enough to avoid large spillage drag penalties. With fan cowl-mounted gearbox and accessories, the lower nacelle maximum diameter becomes much larger than the top and sides. Without drooping, the lower lip would be undesirably thick. In the canted inlet, the inlet front face is offset downward which effectively reduces the lower lip thickness and is therefore desirable. However, the advent of core mounted gearbox and accessories packages has eliminated the need to locally increase the lower nacelle lip thickness. Advantages are potentially available because resulting decreases in projected and wetted areas should produce lower nacelle pressure and friction drag levels. While it has previously been aerodynamically desirable to offset the inlet front face with the core-mounted gearbox and accessories with a core-mounted gearbox, it is desirable to limit the inlet offset so as not to produce an unduly thin lower lip.

SUMMARY OF THE INVENTION

It is, therefore, an object of the present invention to provide a gas turbine inlet with a forward intake that is angled in respect to an engine centerline and includes internal contours that redirect airflow into the engine without causing circumferential pressure gradients that propagate audible frequencies outside the engine.

It is another object of the present invention to provide on a gas turbine inlet with a forward intake that is angled in respect to engine centerline, an intake forward face having a minimum offset from engine centerline to decrease aerodynamic drag caused by the nacelle inlet.

These and other objects will be more fully understood from the drawings and from the following description, all of which are intended to be representative of, rather than in any way limiting on, the scope of the invention.

Briefly, in the apparatus of the present invention, a gas turbine engine nacelle intake is disposed about a curved centerline, a downstream end of which substantially coincides with the engine centerline for the purpose of progressively redirecting intake airflow into alignment with the engine centerline. The internal and external contours of the nacelle are defined as endpoints of radii extending from the curved inlet centerline, and the contours are generally parallel to local centerline contour. With this form of construction, the inner surface of the intake is gradually and progressively curved. The gradual curve causes intake airflow to be progressively turned in the direction of the engine centerline thereby reducing circumferential pressure gradients upstream of the fan and subsequent undesirable effects on acoustic performance. The curved centerline inlet also results in less offset of the front face of the nacelle as opposed to prior art straight line canted nacelles. On an engine with core-mounted gears and accessories, this allows improvement of the lower nacelle external cowling and a reduction of aerodynamic drag.

DESCRIPTION OF THE DRAWINGS

While the specification concludes with the claims distinctly claiming and particularly pointing out the invention described herein, it is believed that the invention will be more clearly understood by reference to the discussion below in conjunction with the following drawings:

DESCRIPTION OF THE PREFERRED EMBODIMENT

Figure 1:
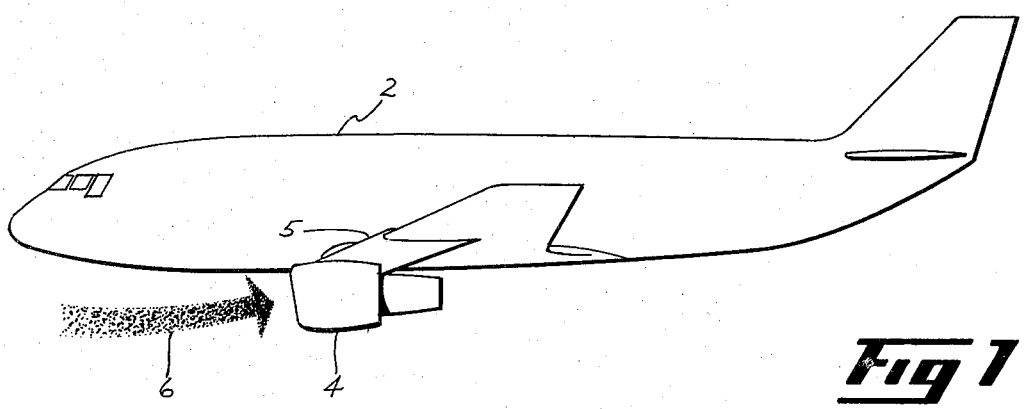
FIG. 1 is a side view of an airplane with a gas turbofan engine mounted under the wing.

Referring now to FIG. 1, an airplane 2 is shown with a gas turbofan engine 4 mounted in an under-the-wing location. The general effect of wing and engine pylon 5 aerodynamics on freestream airflow is indicated by arrow 6. Essentially, the freestream airflow is deflected upward in a region just forward of the engine to follow an upward slant of the pylon 5 and to blend with wing airfoil aerodynamics. The gas turbine engine 4 is mounted such that its inlet extends into that portion of the freestream airflow that has been deflected upwards.

Figure 2:
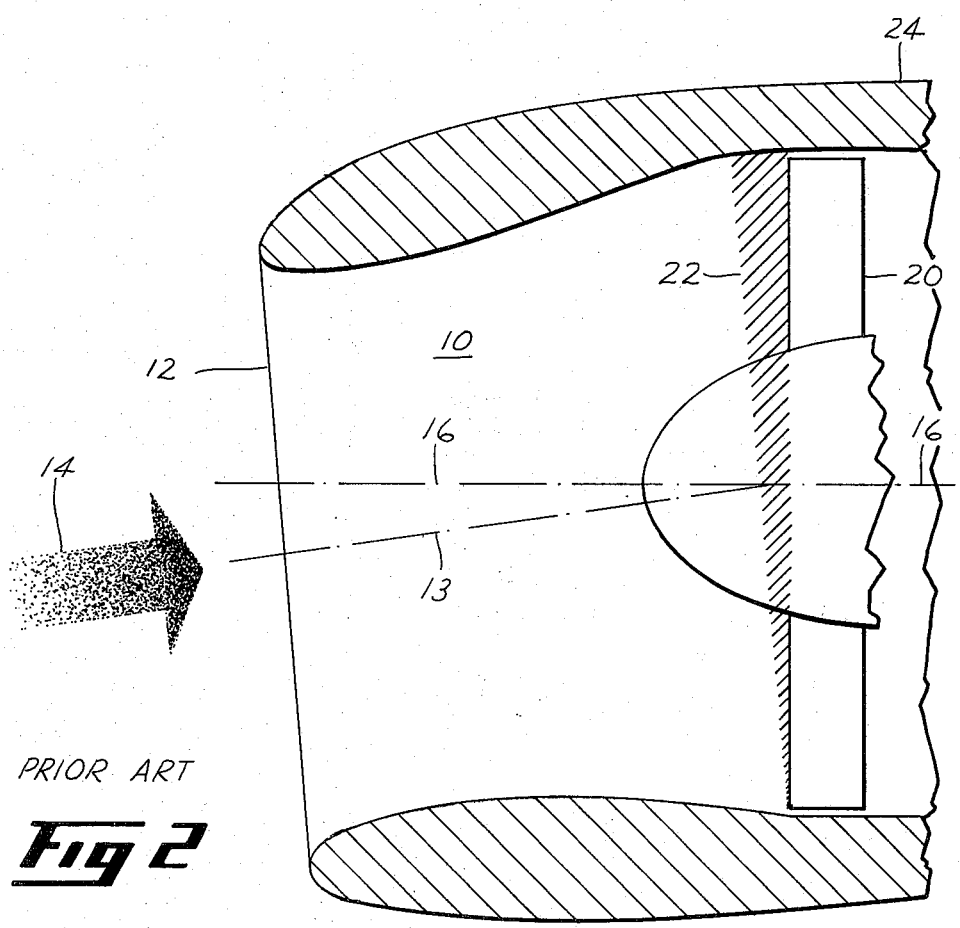
FIG. 2 is a cross-sectional view of a prior art inlet nacelle.

Shown in FIG. 2 is a prior art nacelle inlet 10 that is typical of current generation air intake systems for subsonic commercial aircraft engines mounted in under-the-wing locations. The nacelle inlet 10 has an inlet face 12 that is angled along a straight centerline 13 downwardly so that its forward entry and centerline 13 is in alignment with incoming air, represented by arrow 14, that is flowing at an angle to engine centerline 16. Because freestream airflow direction is altered by engine pylon and airplane wing aerodynamics, this type of inlet nacelle offers aerodynamic advantages of increased intake flow and reduced drag on gas turbine engines that are mounted at under-the-wing locations. A similar type of nacelle that is canted to a lesser angle in respect to the engine centerline is used on tail-mounted engines to compensate for alteration of freestream airflow by tail wing and engine pylon aerodynamics.

Referring again to FIG. 2, a front fan 20, typical of those used on current turbofan engines, is shown directly downstream of the inlet nacelle 10. Incoming airflow is directed by the nacelle 10 into this fan 20 where the airflow is accelerated and directed further downstream in the engine.

In this prior art nacelle 10, interior surface contour is defined around a straight inlet centerline 13. The remaining portion of the engine 10, from the fan 20 downstream, is defined around the engine centerline 16. At a junction between the inlet 10 and the fan 20 a relatively short fairing section 22 is provided to mate the straight centerline canted inlet nacelle 10 to the noncanted engine and remaining portion of engine nacelle 24. At this junction, large volumes of incoming airflow must be redirected to enter the fan 20 parallel to engine centerline 16. In the region of this junction, a flow distortion in the form of a combined circumferential and radial migration of flow streamlines occurs as the flow approaches the fan face and turns to the axial direction. This distortion in flow is characterized by circumferential variation in static pressure, flow velocity, and flow angle.

Figure 3:
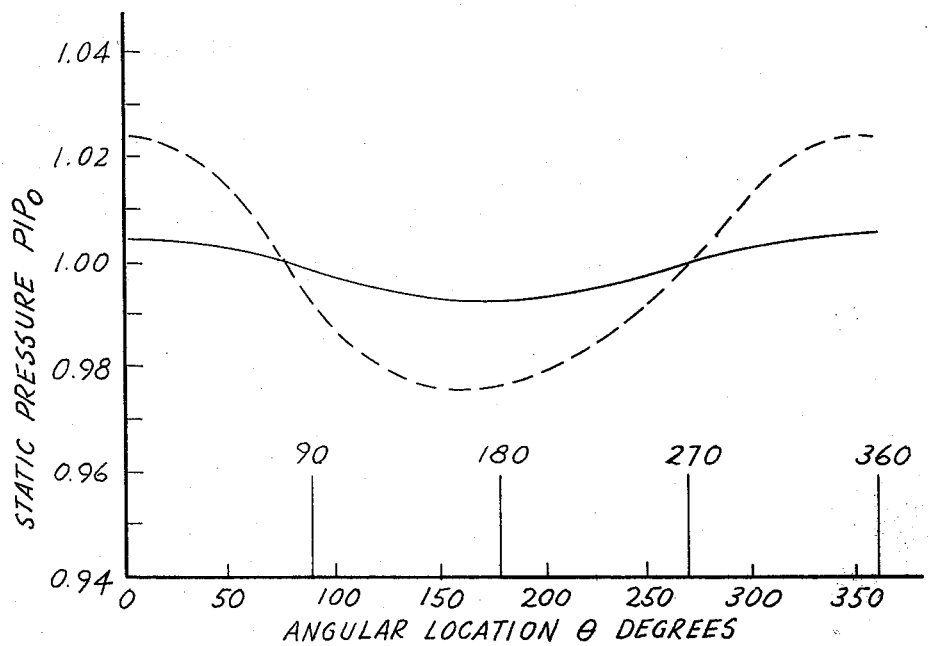
FIG. 3 is a graphical comparison of static pressure as a function of angular location around the nacelle wall.

Circumferential distributions of inlet wall static pressure, just forward of the fan 20, have been measured in flight on canted inlets, and the results are shown in graph form as a dashed line in FIG. 3. This dashed line is a plot of local static pressure divided by average static pressure as a function of angular location around the circumference of the inlet nacelle 10. As the graph indicates, static pressure is lower at the bottom (180 degrees) of the inlet nacelle 10 as viewed in FIG. 2 and higher at the top (0 degrees).

This circumferential pressure distribution is encountered or "seen" by the fan 20 as a change in incoming airflow velocity and flow angle at the top of the nacelle as compared to the bottom. It is well known to those skilled in the art that interaction of a pressure distortion of this type with fan blades will generate tone noise. The tone noise is produced at what is known as blade passing frequencies (BPF) plus harmonics of this frequency. Blade passing frequency caused by the distortion pattern of FIG. 3 is equal to the number of blades times the rotational speed of the fan in revolutions per second (#blades×rev/sec).

Interestingly, while it is well known to those skilled in the art that a pressure distortion can interact with a rotating fan to generate tone noise, it has not been known that canted inlets cause the pressure distortion shown in the graph in FIG. 3 or that this pressure distortion causes a significant amount of audible noise that is emitted from the nacelle inlet. This is partly because almost all acoustic testing of aircraft engines is done on test stands under static conditions. Since the straight centerline canted inlet, shown in FIG. 2, is intended for use only during flight conditions, the canted inlet is not normally used during static testing and, therefore, has been rarely used on engines undergoing static acoustic testing.

There is an additional problem that occurs during static testing that almost completely masks the noise caused by canted inlet pressure distortion. The additional problem is a result of eddies in the incoming airflow caused by external winds, physical obstructions, and other external factors outside the inlet nacelle. These external factors distort the incoming airflow causing very long eddies in the flow, which, in turn, create a major pressure distortion in the inlet that is significantly greater than the pressure distortion caused by canting the inlet. This major pressure distortion causes tone noise that far exceeds and effectively masks the noise caused by the canted inlet.

While this masking occurs during static testing, under flight conditions, the engine is carried at high speeds and the incoming airflow pattern is very different. External factors no longer cause eddies in the flow or any resulting tone noise. Thus, the noise caused by the pressure distortion of the canted inlet becomes a significant acoustic problem during flight conditions. Because limited acoustic testing has been done under flight conditions, and because of misconceptions regarding propagation of fan noise, aircraft manufacturers and those skilled in the art are currently unaware of its significance.

Once it is realized that the straight centerline canted inlet is a major source of noise, the problem becomes a matter of eliminating the source of the noise and still providing an inlet that directly accepts intake air that has been affected by engine pylon and wing aerodynamics. Since noise volume caused by the fan in the inlet is proportional to the magnitude of pressure variation, a solution is elimination of the pressure variation that is indicated by the dashed line on the graph shown in FIG. 3.

Figure 4:
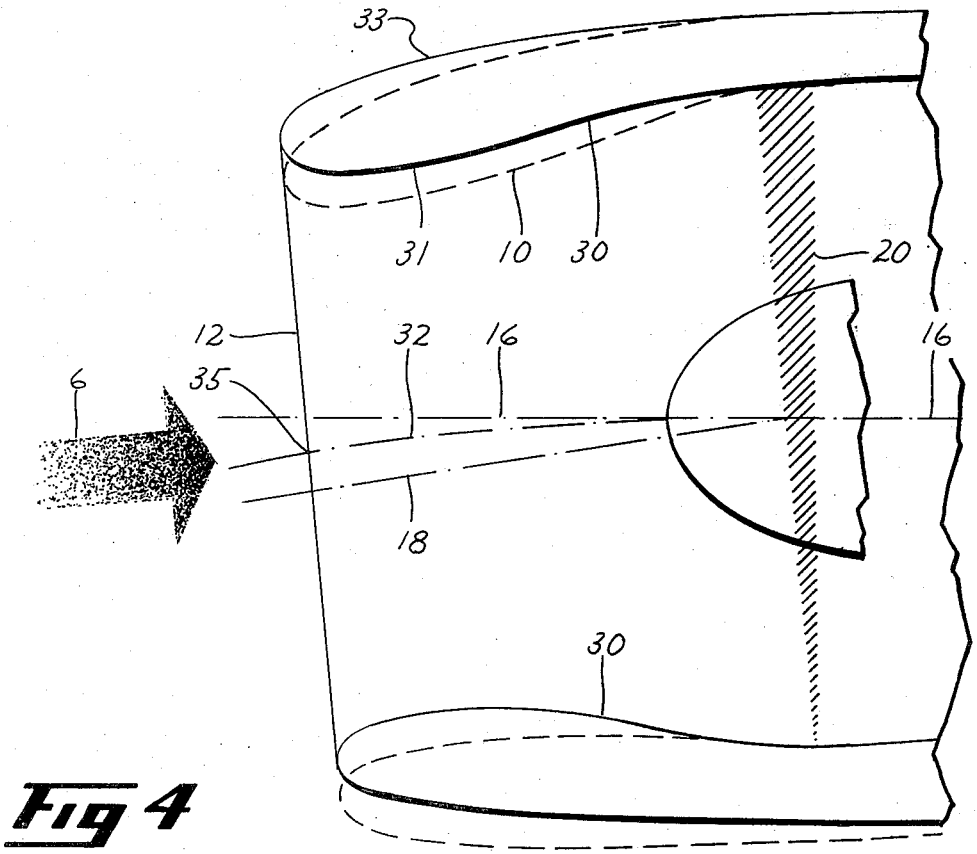
FIG. 4 is a cross-sectional view of the present invention superimposed on a phantom outline of the prior art nacelle.

Referring again to FIG. 2, the pressure distortion in the inlet 10 generally occurs in the region forward of the fan at the fairing 22. Referring now to FIG. 4, the nacelle 30 associated with the present invention is shown superimposed on a phantom outline of the prior art nacelle 10. The present invention involves essentially an inlet nacelle that is defined around a curved centerline 32, as opposed to a straight centerline 13 for prior art nacelle 10. The coordinates of the inlet's internal surface 31 and external surface 33 are defined relative to a large radius curve of centerline 32 to which the engine centerline 16 is tangent near the fan face. Centerline 32 is disposed at the desired inlet flow position such that the inlet face 12, having a center 35, is substantially normal to intake airflow. Inlet surface coordinates are defined as endpoints of radii extending from the curved inlet centerline, and the radii extend outwardly in a direction perpendicular to local centerline contour.

The curved centerline 32 allows the inlet face 12 to be disposed downwardly the desired amount while eliminating the necessity for the fairing 22 and its abrupt transition from inlet centerline 13 to engine centerline 16. The incoming airflow is thereby progressively and gradually turned along a curved path to the direction of the engine centerline 16 before contacting any rotating members of the fan 20. By eliminating the abrupt transition to engine centerline, circumferential pressure distortion is significantly reduced or eliminated, and this will reduce or eliminate this source of tone noise at the blade passing frequency.

Referring to the graph in FIG. 3, a predicted performance result of a curved centerline inlet is shown as a solid line on the graph. The difference in pressure variation within the two types of inlets is readily discernable, and this has a diminishing effect on the generation of noise.

Besides the acoustic advantages of the curved inlet centerline in accordance with the present invention, there are also aerodynamic advantages. Referring now to FIG. 4, it can be appreciated that there is a resulting offset of the center of the inlet face 12 of both the straight centerline inlet nacelle 10 and the curved centerline inlet nacelle 30 from engine centerline. With the curved centerline inlet 30, this offset of the inlet face 12 is less than the corresponding offset with the straight centerline inlet 10.

If the usual location of accessories and gears in the lower lip 34 is changed to a core mounted location, it is possible to substantially decrease lower lip intrusion on freestream airflow and further reduce aerodynamic drag.

While specific embodiments have been described, it will be apparent to those skilled in the art that various modifications thereto can be made without departing from the scope of the invention, as recited in the appended claims. The scope of the invention, therefore, is to be derived from the following claims.

Having described the invention, what is claimed as novel and desired to be secured by Letters Patent of the United States is:

1. An improved gas turbine intake having a front face with a center displaced from an engine centerline, wherein the improvement comprises:
   an internal surface contour based on a curved inlet centerline around which inlet interior surfaces are defined;
   said inlet centerline having a curved upstream portion extending from the front face center downstream in a curve to a point at which the engine centerline is tangent to the inlet centerline; and
   said internal surface contour being curved and defined as endpoints of radii extending from the curved inlet centerline, wherein said radii extend outwardly in a direction perpendicular to local centerline contour.

2. An improved gas turbine intake nacelle having a front face with a center displaced from an engine centerline, wherein the improvement comprises:
   an internal surface contour based on a curved inlet centerline around which inlet interior surfaces are defined for the purpose of reducing noise generation and propagation;
   said inlet centerline having a curved upstream portion extending from the front face center downstream in a curve in a point at which the engine centerline is tangent to the inlet centerline; and
   said internal surface contour being curved and defined as endpoints of radii extending from the curved inlet centerline, wherein said radii extend outwardly in a direction perpendicular to local centerline contour.

3. The improved nacelle recited in claim 2 for a gas turbine engine in which:
   the downstream end of the curved portion of the nacelle inlet centerline is positioned at a point forward of rotating members of the engine, and
   the nacelle inlet centerline continues from said point in a straight line along the engine centerline.

4. The apparatus recited in claim 2, and further comprising:
   a generally curved forward nacelle exterior surface contour defined as endpoints of radii extending outwardly from the curved inlet centerline in a direction perpendicular to local centerline contour.

5. The apparatus recited in claim 4, and further comprising:
   a core-mounted gear and accessory package; and
   a lower nacelle lip having a narrow exterior outline to present a smaller front profile to freestream airflow.

6. A method of directing intake airflow through an inlet of a nacelle into a gas turbine engine that is provided with an inlet face having a center displaced from an engine centerline for accepting freestream airflow directly into the nacelle comprising the steps of:
   gradually and progressively turning the intake airflow along a curved path into alignment with the engine centerline;
   essentially completing the alignment of intake airflow prior to communication with any rotating members for the purpose of eliminating circumferential pressure gradients at and forward of the rotating members.

7. A method of directing intake airflow through an inlet of a nacelle into a gas turbine engine provided with an inlet face having a center displaced from an engine centerline for accepting freestream airflow directly into the nacelle comprising the steps of:
   gradually and progressively turning the intake airflow along a curved path into alignment with the engine centerline;
   essentially completing the alignment of intake airflow prior to communication with any rotating members for the purpose of eliminating circumferential pressure gradients at and forward of the rotating members, thereby reducing generation and emission of noise from within the engine inlet.

* * * * *